United States Patent
Pierscieniak (10) Patent No.: US 11,422,912 B2
(45) Date of Patent: Aug. 23, 2022

(54) ACCURATE TIME ESTIMATES FOR OPERATIONS PERFORMED ON AN SDDC

(71) Applicant: VMware, Inc., Palo Alto, CA (US)

(72) Inventor: Krzysztof K. Pierscieniak, Mountain View, CA (US)

(73) Assignee: VMware, Inc., Palo Alto, CA (US)

(*) Notice: Subject to any disclaimer, the term of this patent is extended or adjusted under 35 U.S.C. 154(b) by 1 day.

(21) Appl. No.: 16/389,214

(22) Filed: Apr. 19, 2019

(65) Prior Publication Data
US 2020/0334060 A1 Oct. 22, 2020

(51) Int. Cl.
| G06F 9/44 | (2018.01) |
| G06F 11/34 | (2006.01) |
| G06F 9/455 | (2018.01) |
| G06F 9/50 | (2006.01) |
| H04L 69/324 | (2022.01) |
| G06F 3/06 | (2006.01) |
| G06F 9/54 | (2006.01) |
| G06F 9/48 | (2006.01) |

(52) U.S. Cl.
CPC ...... *G06F 11/3419* (2013.01); *G06F 9/45558* (2013.01); *G06F 9/5038* (2013.01); *H04L 69/324* (2013.01); *G06F 3/061* (2013.01); *G06F 3/0617* (2013.01); *G06F 9/4893* (2013.01); *G06F 9/5061* (2013.01); *G06F 9/542* (2013.01); *G06F 11/3442* (2013.01); *G06F 2009/4557* (2013.01); *G06F 2009/45591* (2013.01)

(58) Field of Classification Search
CPC . H04L 41/0604; H04L 69/324; G06F 3/0617; G06F 9/542; G06F 9/45558; G06F 9/5083; G06F 9/5061; G06F 9/4893; G06F 3/061; G06F 11/3442; G06F 2009/4557; G06F 2009/45591; G06F 9/5038; G06F 11/3419
See application file for complete search history.

(56) References Cited

U.S. PATENT DOCUMENTS

| 5,687,235 A | 11/1997 | Perlman et al. |
| 6,487,658 B1 | 11/2002 | Micali |
| 8,255,915 B1 | 8/2012 | Blanding et al. |
| 8,266,616 B1 | 9/2012 | Jacquot et al. |
| 8,724,848 B1 | 5/2014 | Heath et al. |

(Continued)

OTHER PUBLICATIONS

KOVAR, Software-Defined Data Centers: Should You Jump on the Bandwagon?, May 13, 2013, pp. 2, 4-6.

*Primary Examiner* — Tuan A Vu (57) ABSTRACT

Accurate time estimates for operations performed on an SDDC are disclosed. The method includes receiving information about a job performed on an SDDC from at least one of a plurality of different reporting SDDC's, the information including a description of the SDDC, a description of the job performed on the SDDC, and a plurality of time stamps, each time stamp indicative of an operation performed on the SDDC in order to complete the job. The information is stored in a database in a granular time-based data set. When a request for a time estimate for a yet-to-be-performed job is received from at least a second SDDC (the request including a description of the SDDC), the stored information is used in conjunction with the description of the second SDDC to generate a time estimate for the yet-to-be-performed job.

20 Claims, 5 Drawing Sheets

(56) References Cited

U.S. PATENT DOCUMENTS

| | | |
|---|---|---|
| 9,553,771 B1 | 1/2017 | McKenna et al. |
| 9,614,833 B1 | 4/2017 | Rao |
| 9,641,344 B1 | 5/2017 | Kim |
| 9,929,780 B2 | 3/2018 | Abbondanzio et al. |
| 10,027,596 B1 | 7/2018 | Harwood |
| 10,083,051 B1 | 9/2018 | Mahapatra et al. |
| 10,205,803 B1 | 2/2019 | Sharifi Mehr |
| 10,447,546 B1 | 10/2019 | Guo et al. |
| 10,454,690 B1 | 10/2019 | Popoveniuc et al. |
| 10,666,424 B1 | 5/2020 | Rutley et al. |
| 10,771,261 B1 | 9/2020 | Lazar et al. |
| 10,911,433 B1 | 2/2021 | Anand |
| 2006/0184349 A1 | 8/2006 | Goud et al. |
| 2007/0143629 A1 | 6/2007 | Hardjono et al. |
| 2007/0150737 A1 | 6/2007 | Parupudi et al. |
| 2008/0271034 A1 | 10/2008 | Miyata |
| 2008/0275975 A1 | 11/2008 | Pandey et al. |
| 2009/0041205 A1 | 2/2009 | Russell et al. |
| 2009/0177461 A1 | 7/2009 | Ehsani et al. |
| 2010/0101339 A1 | 4/2010 | Tatsutani et al. |
| 2010/0138907 A1 | 6/2010 | Grajek et al. |
| 2011/0055588 A1 | 3/2011 | Dehaan |
| 2011/0191217 A1 | 8/2011 | Saiu et al. |
| 2011/0213966 A1 | 9/2011 | Fu et al. |
| 2011/0276951 A1 | 11/2011 | Jain |
| 2011/0298607 A1 | 12/2011 | Priyantha et al. |
| 2012/0072721 A1 | 3/2012 | Rescorla et al. |
| 2012/0072910 A1 | 3/2012 | Martin et al. |
| 2012/0116590 A1 | 5/2012 | Florez-Larrahondo et al. |
| 2012/0137289 A1 | 5/2012 | Nolterieke et al. |
| 2012/0180055 A1* | 7/2012 | Brech ............... G06F 9/4893 718/102 |
| 2013/0007868 A1 | 1/2013 | Hoggan et al. |
| 2013/0117558 A1 | 5/2013 | Metke et al. |
| 2013/0159910 A1 | 6/2013 | Bostic et al. |
| 2013/0179947 A1 | 7/2013 | Kline et al. |
| 2013/0219068 A1* | 8/2013 | Ballani ............... G06F 9/5061 709/226 |
| 2013/0223684 A1 | 8/2013 | Townend et al. |
| 2014/0006862 A1* | 1/2014 | Jain ............... H04L 41/0604 714/26 |
| 2014/0055248 A1 | 2/2014 | Hammelbacher |
| 2014/0136511 A1 | 5/2014 | Hughes et al. |
| 2014/0278703 A1 | 9/2014 | Owens et al. |
| 2014/0298091 A1 | 10/2014 | Carlen et al. |
| 2014/0331297 A1 | 11/2014 | Innes et al. |
| 2015/0009013 A1 | 1/2015 | Cartwright et al. |
| 2015/0067294 A1 | 3/2015 | Hu et al. |
| 2015/0098608 A1 | 4/2015 | Hintermeister et al. |
| 2015/0234617 A1* | 8/2015 | Li ............... G06F 3/0617 711/114 |
| 2015/0277987 A1* | 10/2015 | Di Balsamo ......... G06F 9/5083 718/104 |
| 2015/0318996 A1 | 11/2015 | Van Roermund |
| 2015/0341220 A1 | 11/2015 | Sikand et al. |
| 2015/0370583 A1* | 12/2015 | Shah ............... G06F 9/542 703/22 |
| 2015/0370587 A1* | 12/2015 | Kureha ............... G06F 9/45558 718/1 |
| 2016/0134621 A1 | 5/2016 | Palanigounder |
| 2016/0299957 A1 | 10/2016 | A. C. et al. |
| 2016/0337446 A1 | 11/2016 | Abali et al. |
| 2016/0344768 A1 | 11/2016 | McGrew et al. |
| 2016/0380815 A1* | 12/2016 | Agarwal ............... H04L 69/324 709/220 |
| 2017/0006022 A1 | 1/2017 | Gunti et al. |
| 2017/0094509 A1 | 3/2017 | Mistry et al. |
| 2017/0163481 A1 | 6/2017 | Figueroa et al. |
| 2017/0255494 A1 | 9/2017 | Bartfai-Walcott et al. |
| 2017/0286252 A1* | 10/2017 | Illikkal ............... G06F 11/3442 |
| 2017/0293447 A1 | 10/2017 | Bivens et al. |
| 2018/0012261 A1 | 1/2018 | Cai et al. |
| 2018/0097803 A1 | 4/2018 | Iwanir et al. |
| 2018/0143854 A1 | 5/2018 | Kumar et al. |
| 2018/0159837 A1 | 6/2018 | Kola et al. |
| 2018/0211178 A1 | 7/2018 | Millius et al. |
| 2018/0248924 A1 | 8/2018 | Siddappa et al. |
| 2018/0287804 A1 | 10/2018 | Geisbush |
| 2018/0295036 A1 | 10/2018 | Krishnamurthy et al. |
| 2018/0367521 A1 | 12/2018 | Daidone et al. |
| 2019/0108239 A1 | 4/2019 | Yang et al. |
| 2019/0132309 A1 | 5/2019 | Wei |
| 2019/0190893 A1 | 6/2019 | Troia et al. |
| 2019/0235902 A1 | 8/2019 | Wei et al. |
| 2019/0245700 A1 | 8/2019 | Dobre et al. |
| 2019/0278663 A1* | 9/2019 | Mehta ............... G06F 3/061 |
| 2020/0014636 A1 | 1/2020 | Vallepalli et al. |
| 2020/0028842 A1 | 1/2020 | Leiserson et al. |
| 2020/0183743 A1 | 6/2020 | Moore et al. |

\* cited by examiner

RECEIVING, AT A COMPUTING SYSTEM, INFORMATION ABOUT A JOB PERFORMED ON AN SDDC FROM AT LEAST ONE OF A PLURALITY OF DIFFERENT REPORTING SDDC'S, THE INFORMATION COMPRISING: A DESCRIPTION OF THE SDDC; A DESCRIPTION OF THE JOB PERFORMED ON THE SDDC; A PLURALITY OF TIME STAMPS, EACH TIME STAMP INDICATIVE OF AN OPERATION PERFORMED ON THE SDDC IN ORDER TO COMPLETE THE JOB. _410_

STORING, IN A DATABASE ACCESSIBLE TO THE COMPUTING SYSTEM, THE INFORMATION ABOUT THE JOB IN A GRANULAR TIME-BASED DATA-SET. _415_

RECEIVING, AT THE COMPUTING SYSTEM, A REQUEST FOR A TIME ESTIMATE FOR A YET-TO-BE-PERFORMED JOB FROM AT LEAST A SECOND SCCD, THE REQUEST INCLUDING A DESCRIPTION OF THE SECOND SDDC. _420_

USING, AT THE COMPUTING SYSTEM, THE STORED INFORMATION IN CONJUNCTION WITH THE DESCRIPTION OF THE SECOND SDDC TO GENERATE A TIME ESTIMATE FOR THE YET-TO-BE-PERFORMED JOB. _425_

*FIG. 4*

ACCURATE TIME ESTIMATES FOR OPERATIONS PERFORMED ON AN SDDC

BACKGROUND

Virtual-machine technology essentially abstracts the hardware resources and interfaces of a computer system on behalf of one or multiple virtual machines, each comprising one or more application programs and an operating system. The recent emergence of cloud computing services can provide abstract interfaces to enormous collections of geographically dispersed data centers, allowing computational service providers to develop and deploy complex Internet-based services that execute on tens or hundreds of physical servers through abstract cloud-computing interfaces.

Within virtual servers as well as physical servers, virtual machines and virtual applications can be moved among multiple virtual or physical processors in order to facilitate load balancing and to co-locate compatible virtual machines and virtual applications with respect to virtual and physical processors. Similarly, virtual machines and virtual applications can be moved among the virtual servers in a virtual data center as well as among physical servers in the underlying physical hardware in which virtual data centers are constructed. Migration of virtual machines and virtual applications in virtual data centers can also be used for load balancing, fault tolerance and high availability, and for many other purposes.

However, managing the virtual servers as well as physical servers, virtual machines and virtual applications often requires on site access which can be expensive and inconvenient depending upon the location of the remote site.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included in the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

In the following discussion, the term "accurate time estimates" is used. For purposes of clarity, it should be appreciated that the use of the term "accurate" is a colloquialism used herein to encompass many different dimensions of the resulting time estimates. For example, "accurate" time measurements are complete time measurements, valid time measurements, consistent time measurements, "timely" time measurements, reliable time measurements, high-quality time measurements, and the like. Thus, the "accurate time estimates" that are described herein are better than what previously existed and are therefore appropriate for their specific use.

Some portions of the detailed descriptions which follow are presented in terms of procedures, logic blocks, processing and other symbolic representations of operations on data bits in a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "connecting," "displaying," "receiving," "providing," "determining," "generating," "establishing," "managing," "extending," "creating," "migrating," "effectuating," or the like, refer to the actions and processes of an electronic computing device (e.g., ClientMachine) or system such as: a host processor, a processor, a memory, a virtual storage area network (VSAN), a virtualization management server or a virtual machine (VM), among others, of a virtualization infrastructure or a computer system of a distributed computing system, or the like, or a combination thereof. It should be appreciated that the virtualization infrastructure may be on-premises (e.g., local) or off-premises (e.g., remote or cloud-based), or a combination thereof. The electronic device manipulates and transforms data represented as physical (electronic and/or magnetic) quantities in the electronic device's registers and memories into other data similarly represented as physical quantities in the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the Figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided in dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

The discussion begins with a description of an example computer system environment, upon which embodiments of the present invention may be implemented. An example cloud-based computing environment, upon which embodiments of the present invention may be implemented, is then discussed. Finally, a discussion of the ability to provide a high quality time estimate (HQTE) is provided.

Importantly, the embodiments of the present invention, as will be described below, provide an approach for HQTE which differs significantly from the conventional processes used to make time estimate determinations. In conventional approaches, time estimation is performed by segmenting the upgrade process, or any operation task (job), into a set number of discrete steps, each of predefined maximum duration, does not yield satisfactory estimates. Moreover, such conventional approaches are tedious, time-consuming, and often result in increased IT costs or contracted fault payments.

For example, the upgrade can be segmented into 6 distinct segments, each segment takes between 30-45 minutes. Using the 45 minute (maximum duration) the entire upgrade will be estimated at 4.5 hours (6*45 minutes=270 minutes).

However, in one example, when the upgrade is performed it is determined that all 6 segments can be performed at the same time and the longest segment took 43 minutes to complete. As such, the true time for the upgrade is 43 minutes. This is a significant difference between the estimation (270 minutes) and the actual upgrade time (43 minutes).

In another example, when the upgrade is performed it is determined that 3 segments can be performed at the same time and with the longest segment taking 43 minutes to complete. The second 3 segments can also be performed at the same time and with the longest segment taking 45 minutes to complete. As such, the true time for the upgrade is 88 minutes (43 minutes+45 minutes). Once again, this is a significant difference between the estimation (270 minutes) and the actual upgrade time (43 minutes).

In contrast, assume the upgrade can be segmented into 6 distinct segments with each segment taking between 30-45 minutes. If it was assumed that all 6 distinct segments could be performed at the same time, the estimate would be 45 minutes. However, when the upgrade is actually performed it is determined that some number (e.g., 4 of the segments) must be performed individually and each segment takes 40 minutes to complete. As such, the true time for the upgrade is 40 minutes *5 (the 4 segments that need to be upgraded individually and the remaining segments done in concert) or 200 minutes. This is a significant difference between the estimation (45 minutes) and the actual upgrade time (200 minutes).

Such a time difference could cause what was supposed to be a relatively small amount of down time of the data center into a significant amount of time. For example, if the upgraded was estimated to require 45 minutes, the upgrade could be started at 6 am. With the expectation that the upgrade would be fully completed well before the 8 am workday. However, after starting at 6 am, the upgrade would not be complete until after 9:30 am. As such, an amount of workday would be lost and could even result in breach of contract (to include previously negotiated fees) between the data center providers and the data center users. Moreover, if this happened more than once, the users could even look for other more reliable data center providers.

The technology performs high quality time estimations (HQTE) based on analytics (machine learning, collective data sharing, similar scale upgrade determination, etc.) that use past upgrade timelines for similar upgrades to develop the HQTE. In general, the HQTE relies on VMware Analytics Cloud (VAC) data.

The present technology uses a methodology that collects and transmits product usage data from each software-defined data center (SDDC) back to the VMware Analytics Cloud (VAC) infrastructure. The SDDC's not only provide upgrade information, but any analytic based information regarding operations in the SDDC. Such information can be streamed back to VMware in near-real time through VMware Analytics Cloud Services. Data collected includes configuration, feature and upgrade descriptions and the time based information. The estimator will use this data to provide HQTE for any operations that are to be performed on an SDDC.

For example, all SDDC components time-stamp and log start/end time of every operation to a consolidated VAC database, building-up a completely granular time-based data-set, which can be segmented and queried in real-time to derive, based on past analogous outcomes, the time-estimate for any SDDC operation. For example, as a given topology is discovered during the upgrade process, the data-set can identify a set of comparable (most-like) deployments, from which past upgrade times of all other users can algorithmically refine HQTE for the current and remaining upgrade steps of any next user. Every subsequent upgrade augments the data-set, permitting incrementally improved segmentation and ever-more accurate estimation. All users benefit from this anonymized collective intelligence, which does not in any way negatively impact on the privacy/security of any individual participant in the data-sharing scheme.

Importantly, the embodiments of the present invention, as will be described below, provide an approach for generating HQTE which differs significantly from the conventional processes used in SDDC estimations. That is, the present embodiments, as will be described and explained below in detail, provide a previously unknown procedure for managing a virtual data center. With evolving technology, aiming at reducing IT costs, it makes sense for SDDC's to have the capability to provide estimates that are aligned with actual time costs versus a compilation of time estimates for every portion of a job.

Further, the HQTE is not just based on data that was previously provided. Instead, it also learns from the data to reduce down time for errors, conflicts, trust issues, certificates, handshake issues, new or upgraded incompatibility with legacy devices, etc. Thus, the HQTE is not merely a re-formatting of a previously done process, a mathematical solution, or a problem that can be solved by pen and paper. Instead, it is a real-time, constantly updating estimator that not only compares similar jobs across similar SDDC's but uses information at the granular level, extrapolates an HQTE for non-similar SDDC's, based on a breakdown of the required steps in a given job (which may include thousands or hundreds of thousands of steps and hundreds or thousands of VM's), an extrapolation of a large SDDC based on a smaller SDDC, an extrapolation of a HQTE 340 for a smaller SDDC based on a larger SDDC, and the like.

As will be described in detail, the various embodiments of the present invention do not merely implement time estimations processes on a computer. Instead, the various embodiments of the present invention, in part, provide a previously unknown procedure for providing HQTE in a virtual data center. Hence, embodiments of the present invention provide a novel process for HQTE for a virtual data center which is necessarily rooted in computer technology to overcome a problem specifically arising in the realm of hyper converged infrastructures and distributed systems.

Example Computer System Environment

Figure 1:
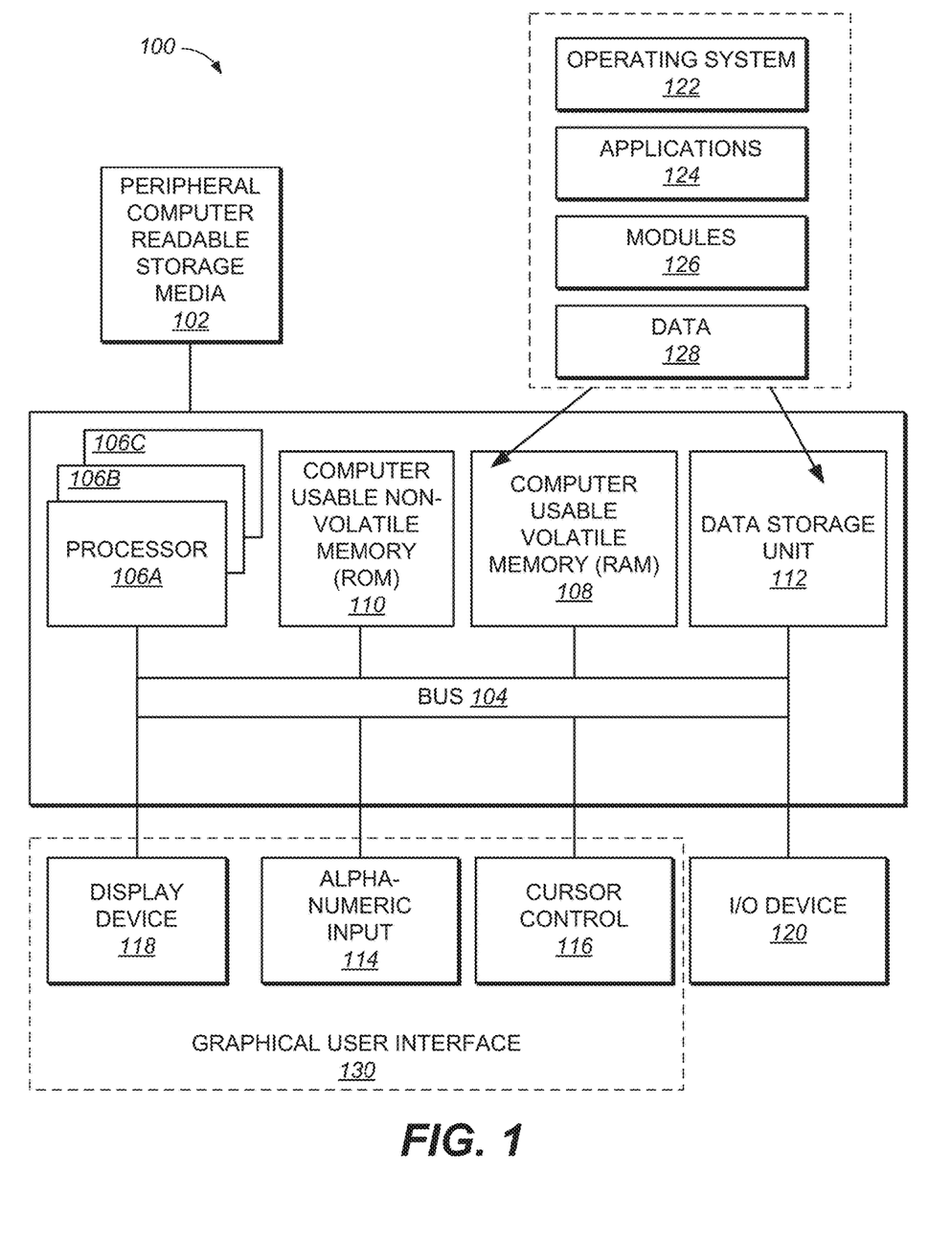
FIG. 1 illustrates an example computer system upon which embodiments of the present invention can be implemented.

With reference now to FIG. 1, all or portions of some embodiments described herein are composed of computer-readable and computer-executable instructions that reside, for example, in computer-usable/computer-readable storage media of a computer system. That is, FIG. 1 illustrates one example of a type of computer (computer system 100) that can be used in accordance with or to implement various embodiments which are discussed herein. It is appreciated that computer system 100 of FIG. 1 is only an example and that embodiments as described herein can operate on or in a number of different computer systems including, but not limited to, general purpose networked computer systems, embedded computer systems, routers, switches, server devices, client devices, various intermediate devices/nodes, stand-alone computer systems, media centers, handheld computer systems, multi-media devices, virtual machines, virtualization management servers, and the like. Computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 100 of FIG. 1 includes an address/data bus 104 for communicating information, and a processor 106A coupled with bus 104 for processing information and instructions. As depicted in FIG. 1, system 100 is also well suited to a multi-processor environment in which a plurality of processors 106A, 1066, and 106C are present. Conversely, system 100 is also well suited to having a single processor such as, for example, processor 106A. Processors 106A, 1066, and 106C may be any of various types of microprocessors. System 100 also includes data storage features such as a computer usable volatile memory 108, e.g., random access memory (RAM), coupled with bus 104 for storing information and instructions for processors 106A, 106B, and 106C. System 100 also includes computer usable non-volatile memory 110, e.g., read only memory (ROM), coupled with bus 104 for storing static information and instructions for processors 106A, 1066, and 106C. Also present in system 100 is a data storage unit 112 (e.g., a magnetic or optical disc and disc drive) coupled with bus 104 for storing information and instructions. System 100 also includes an alphanumeric input device 114 including alphanumeric and function keys coupled with bus 104 for communicating information and command selections to processor 106A or processors 106A, 106B, and 106C. System 100 also includes an cursor control device 116 coupled with bus 104 for communicating user input information and command selections to processor 106A or processors 106A, 106B, and 106C. In one embodiment, system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a UI 130 under the direction of a processor (e.g., processor 106A or processors 106A, 106B, and 106C). UI 130 allows user to interact with system 100 through graphical representations presented on display device 118 by interacting with alphanumeric input device 114 and/or cursor control device 116.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations in RAM 108, computer-readable storage media in data storage unit 112, peripheral computer-readable storage media 102, and/or other tangible computer-readable storage media.

Example Computing Environment

Figure 2A:
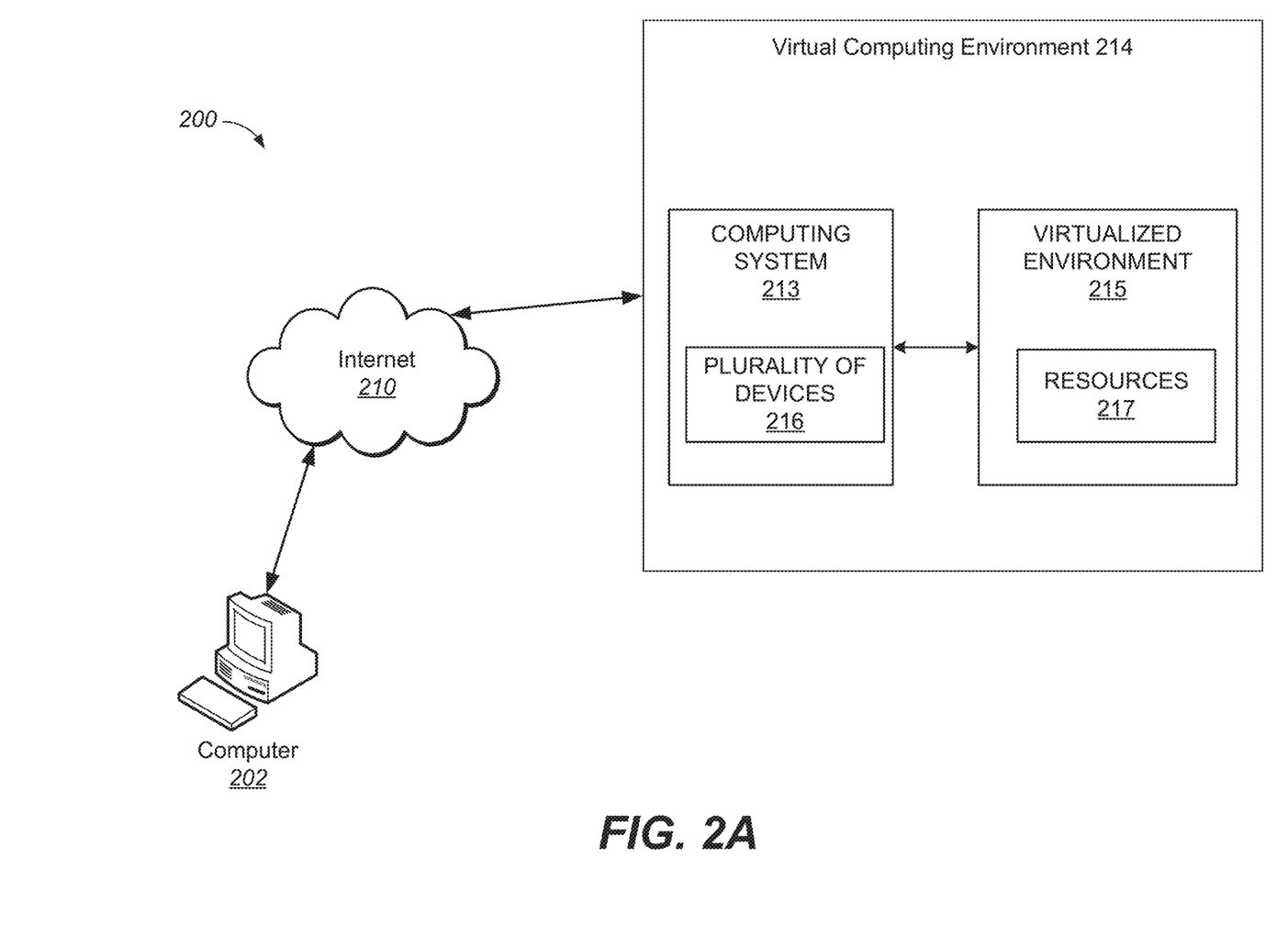
FIG. 2A illustrates an example cloud-based computing environment communicatively coupled with an out-of-network computer system upon which embodiments described herein may be implemented.

FIG. 2A illustrates an example virtual computing environment communicatively coupled with an out-of-network computing device 202 upon which embodiments described herein may be implemented. In the cloud-computing paradigm, computing cycles and data-storage facilities are provided to organizations and individuals by cloud-computing providers. In addition, larger organizations may elect to establish private cloud-computing facilities in addition to, or instead of subscribing to computing services provided by public cloud-computing service providers. In FIG. 2A, a system administrator for an organization, using out-of-network computing device 202, accesses the virtual computing environment (VCE 214), through a connection such as, but not limited to, the Internet 210.

For example, the administrator can, using out-of-network computing device 202, configure virtual computer systems and even entire virtual data centers and launch execution of application programs on the virtual computer systems and virtual data centers in order to carry out any of many different types of computational tasks.

In one embodiment, VCE 214 (or virtualization infrastructure) includes computing system 213 and virtualized environment 215, according to various embodiments. In general, computing system 213 and virtualized environment 215 are communicatively coupled over a network such that computing system 213 may access functionality of virtualized environment 215.

In one embodiment, computing system 213 may be a system (e.g., enterprise system) or network that includes a combination of computer hardware and software. The corporation or enterprise utilizes the combination of hardware and software to organize and run its operations. To do this, computing system 213 uses resources 217 because computing system 213 typically does not have dedicated resources that can be given to the virtualized environment 215. For example, an enterprise system (of the computing system 213) may provide various computing resources for various needs such as, but not limited to information technology (IT), security, email, etc.

In various embodiments, computing system 213 includes a plurality of devices 216. The devices are any number of physical and/or virtual machines. For example, in one embodiment, computing system 213 is a corporate computing environment that includes tens of thousands of physical and/or virtual machines. It is understood that a virtual machine is implemented in virtualized environment 215 that includes one or some combination of physical computing machines. Virtualized environment 215 provides resources 217, such as storage, memory, servers, CPUs, network switches, etc., that are the underlying hardware infrastructure for VCE 214.

The physical and/or virtual machines of the computing system 213 may include a variety of operating systems and applications (e.g., operating system, word processing, etc.). The physical and/or virtual machines may have the same installed applications or may have different installed applications or software. The installed software may be one or more software applications from one or more vendors.

Each virtual machine may include a guest operating system and a guest file system.

Moreover, the virtual machines may be logically grouped. That is, a subset of virtual machines may be grouped together in a container (e.g., VMware apt). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The virtualization infrastructure may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 213 may be a cloud environment, built upon a virtualized environment 215. Computing system 213 may be located in an Internet connected datacenter or a private cloud computing center coupled with one or more public and/or private networks. Computing system 213, in one embodiment, typically couples with a virtual or physical entity in a computing environment through a network connection which may be a public network connection, private network connection, or some combination thereof. For example, a user may connect, via an Internet connection, with computing system 213 by accessing a web page or application presented by computing system 213 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESXTM hypervisor, a VMware Exit hypervisor, etc.) For example, if hypervisor is a VMware ESXTM hypervisor, then virtual functionality of the host is considered a VMware ESXTM server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a virtual system are provided with respect to FIG. 2B.

During use, the virtual machines perform various workloads. For example, the virtual machines perform the workloads based on executing various applications. The virtual machines can perform various workloads separately and/or in combination with one another.

Example Vmware EVO SDDC Rack

Figure 2B:
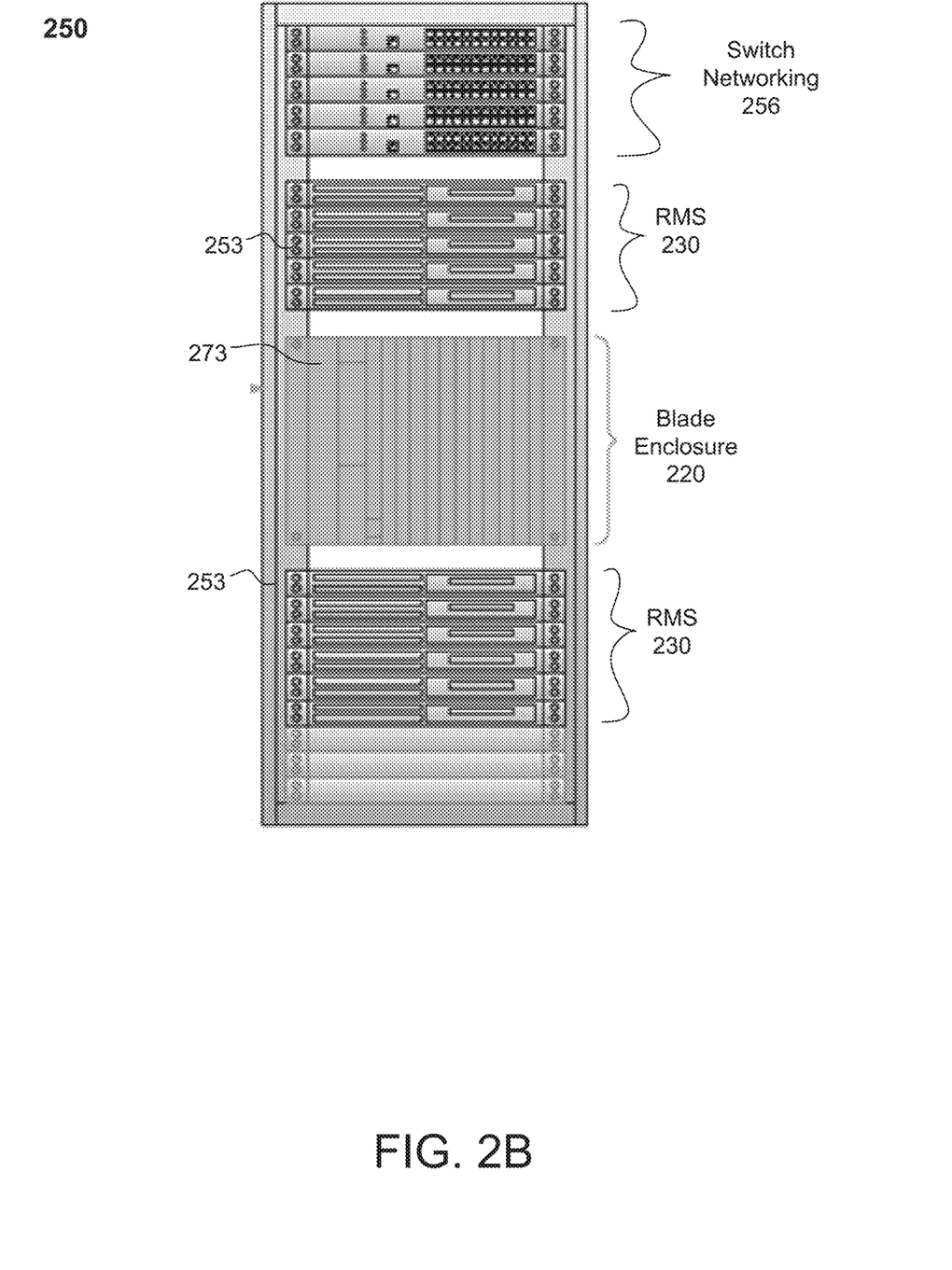
FIG. 2B illustrates a block diagram of a VMware EVO SDDC rack upon which embodiments described herein may be implemented.

With reference now to FIG. 2B, a block diagram of a VMware EVO SDDC rack 250 (hereinafter SDDC rack 250) is shown in accordance with an embodiment. In one embodiment, SDDC rack 250 is a combination of software and hardware that are stored on a rack. However, the technology is also suited to one or more components of SDDC rack 250 being stored in locations other than the rack. Moreover, although there are some specific organizations of SDDC rack 250 discussed herein and contained in the Figures, the technology may be well suited to different arrangements, organization, or the like. In general, SDDC rack 250 utilizes the concepts of virtualization across all data center resources and services (compute, storage, and networking) to deliver a fully automated, zero-downtime infrastructure that can transparently include different hardware over time. SDDC rack 250 provides abstraction, pooling, and automation of the compute/storage/networking infrastructure services. Under SDDC rack 250, policy-driven automation will enable provisioning and ongoing management of both physical and logical compute, storage, and network services. In FIG. 2B, SDDC rack 250 includes switch networking 256, blade enclosure 220, and rack server or rackmount servers (RMS) 230.

Switching networking 256 may also include management capabilities that are part of a dedicated management infrastructure running in each physical rack. The management capabilities include aspects such as inventory management, security management, performance management, and availability management.

Inventory management refers to aspects such as a virtual resource manager (VRM), and the like. VRM is a hardware abstraction layer that interfaces with the hardware components such as servers with direct attached storage (DAS), switches, power distribution units (PDUs), and other physical devices. It is responsible for discovery, inventory, monitoring, configuration, and lifecycle management of individual servers or switches. For example, the VRM will automatically discover new devices and processes hardware events (e.g., alarms, sensor data threshold triggers) and state changes. VRM then exposes events and state changes to the rest of the SDDC rack in a hardware-independent manner. VRM also supports rack-level boot-up sequencing of hardware components and provides services such as secure, remote, hard reset of these components.

In general, VRM manages the physical components of the physical rack, e.g., blade server(s) 273 in blade enclosure 220, servers in RMS 230, and the like; and maintains a corresponding software physical rack object. In other words, VRM monitors the hardware health of the switches and hosts and reports each one's health status. Thus, the VMware EVO SDDC system calculates the hardware health state of the resource based on the current set of alerts that the VRM has raised for that hardware resource and the severities of those alerts, including any alerts on the hardware Field Replaceable Units (FRUs) contained within that resource.

In one embodiment, security management manages remoted disks and access to one or more resources in rack 250. Security management may manage access using secure industry authentication schemes.

In one embodiment, performance management matches application performance needs with available infrastructure. Availability management matches application availability requirements for the given application.

Switch networking 256 includes one or more different switch and network devices that allow rack 250 to communicate with different racks, different switches, switches from different manufacturers, racks with different operating systems, and the like. A switch in switch networking 256 may be any of a number of switch types, such as, for example, a management switch, a top of rack (TOR) switch, spine switch, or the like.

Blade enclosure 220 is an enclosure to host one or more blade server(s) 273. Similarly, RMS 230 refers to one or more rack server(s) 253 stored in rack 250. In general, server 253 may be any of a plurality of server types. One example of a server's characteristics may be an Intel x86 based server that contains redundant, multi-gigabit network interfaces, power supplies, as well as a combination of hard drives and solid state drives. Although in FIG. 2B, a specific number of servers, blades, and switches are shown, it should be appreciated that one embodiment of a full rack may include 24 nodes which may be include a number of servers, a number of blades, a number of switches, a number of other components, and the like. Thus, the use of arrangement provided in the diagram and used in the discussion is merely for purposes of clarity.

Figure 3:
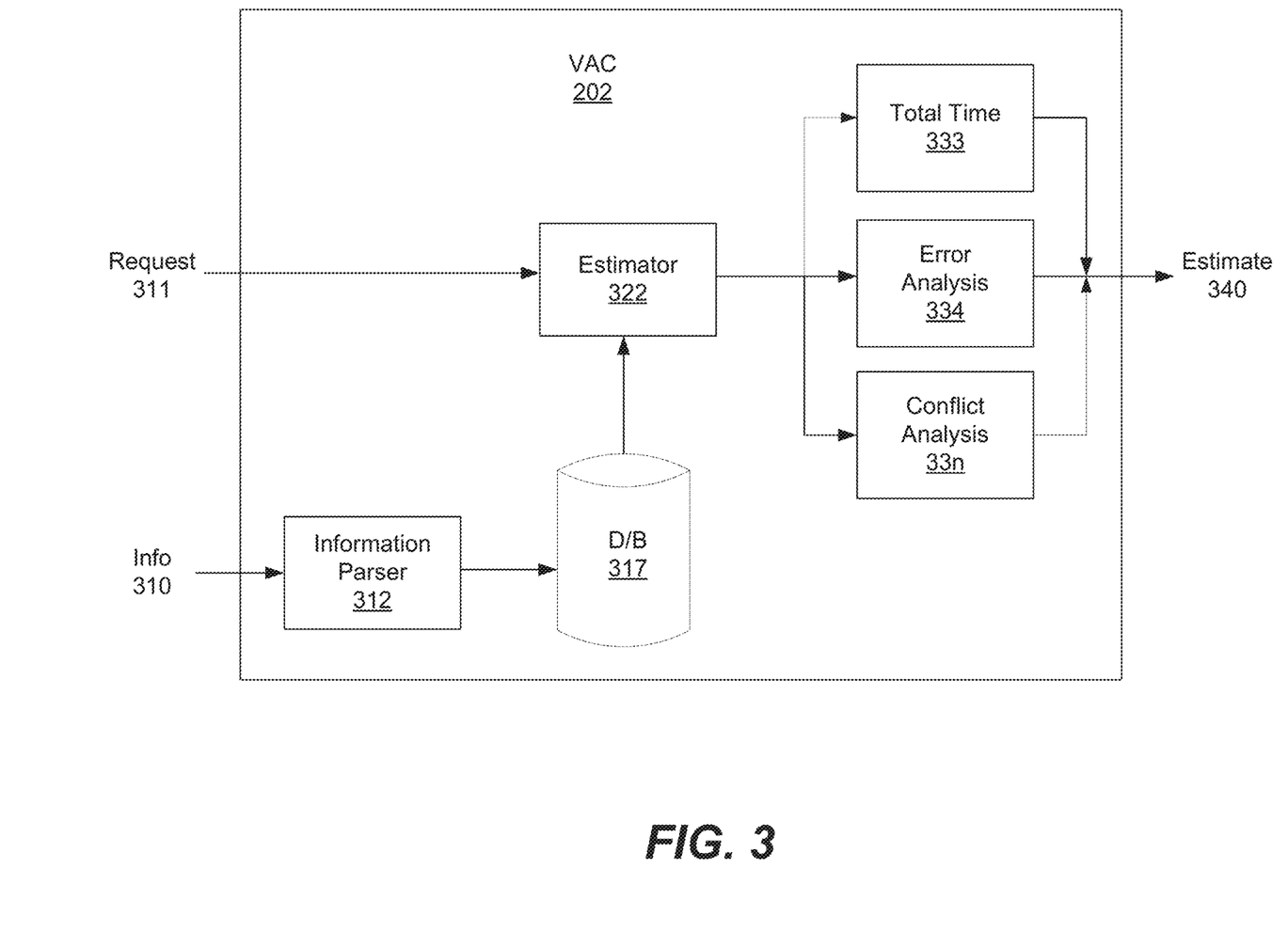
FIG. 3 illustrates a block diagram of a HQET, according to various embodiments.

With reference now to FIG. 3, in one embodiment, once the information 310 is received at the information parser 312 at VAC 202 it is parsed into a number of different categories and is input into database 317. For example, information 310 includes a description of the SDDC and the associated components, a time-stamp and log start/end time of every operation performed on the SDDC with respect to each job, an identification of any errors encountered during the job along with an indication of any solutions for those errors, an identification of any conflicts encountered during the job along with an indication of any solutions for those conflicts, and the like.

In one embodiment, the information 310 is provided to a consolidated VAC database 317, building-up a completely granular time-based data-set, which can be segmented and queried.

Estimator 322 accesses, queries and segments the database 317 in real-time to derive, based on past analogous outcomes, the time-estimate for any SDDC operation (e.g., as defined by request 322). For example, as a given topology is identified in request 311, the data-set can identify a set of comparable (most-like) deployments, from which past upgrade times of all other users can algorithmically refine HQTE for the current and remaining upgrade steps of any next user. Every subsequent upgrade augments the data-set, permitting incrementally improved segmentation and evermore accurate estimation.

For example, estimator 222 can provide an HQTE 340 that can be based on one or more of a total time 330, an error analysis time 334, a conflict analysis time 33n, and the like. Thus, the HQTE 340 can be as granular as a user desires to obtain the most accurate HQTE 340. Thus, by sharing the information 310, all users of VAC 202 benefit from this anonymized collective intelligence, which does not in any way negatively impact on the privacy/security of any individual participant in the data-sharing scheme.

Figure 4:
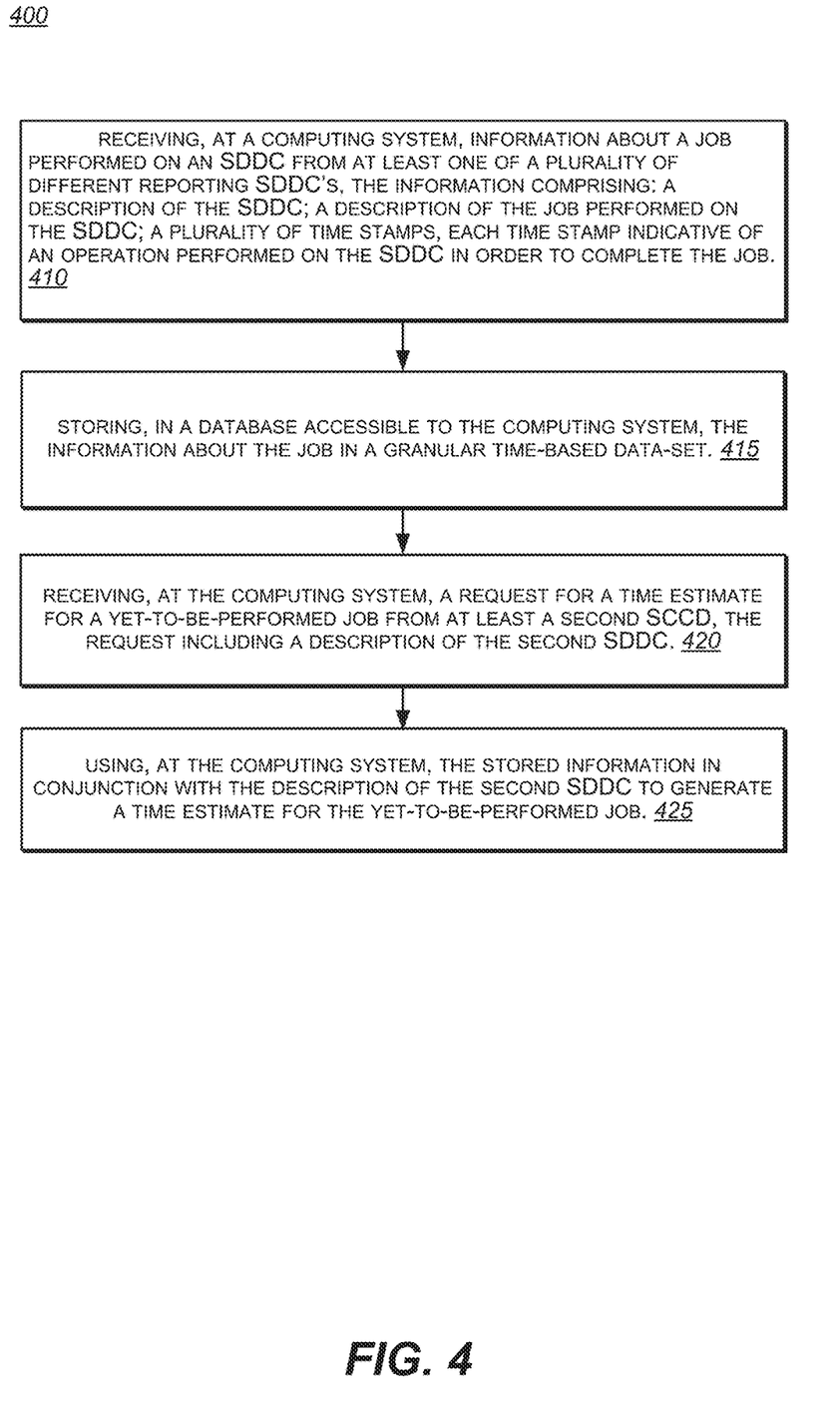
FIG. 4 illustrates a flow diagram of a method for making accurate time estimates for operations performed on an SDDC, according to various embodiments.

FIG. 4 illustrates a flow diagram 400 of a method for accurate time estimates for operations performed on an SDDC, according to various embodiments. Procedures of the method will be described with reference to elements and/or components of FIGS. 1-3. It is appreciated that in some embodiments, the procedures may be performed in a different order than described, that some of the described procedures may not be performed, and/or that one or more additional procedures to those described may be performed. Flow diagram 400 includes some procedures that, in various embodiments, are carried out by one or more processors under the control of computer-readable and computer-executable instructions that are stored on non-transitory computer-readable storage media. It is further appreciated that one or more procedures described in flow diagram 400 may be implemented in hardware, software, or a combination of hardware with firmware and/or software.

With reference to 410 of flow diagram 400 and to FIG. 3, one embodiment receives, at a computing device such as VAC 202, information about a job performed on an SDDC from at least one of a plurality of different reporting SDDC's. In one embodiment, the information 310 will include a description of the SDDC, a description of the job performed on the SDDC, a plurality of time stamps, each time stamp indicative of an operation performed on the SDDC in order to complete the job, and the like. In one embodiment, the information 310 will also include an identification of any errors encountered during the job along with an indication of any solutions for those errors, an identification of any conflicts encountered during the job along with an indication of any solutions for those conflicts, and the like.

Referring now to 415 of flow diagram 400 and to FIG. 3, one embodiment, stores the information about the job in a granular time-based data-set within database 317.

With reference to 420 of flow diagram 400 and to FIG. 3, one embodiment receives a request 311 for a time estimate for a yet-to-be-performed job from at least a second SDDC, the request including a description of the second SDDC.

Referring now to 425 of flow diagram 400 and to FIG. 3, one embodiment, uses the stored information 310 in conjunction with the description of the second SDDC to generate a time estimate e.g., HQTE 340, for the yet-to-be-performed job.

In one embodiment, the HQTE 340 is updated based on identified conflicts and their known resolution, identified errors and their known resolution, identified communications errors that previously occurred after a similar activity and their known resolution, etc. As such, the HQTE 340 does not just review data that was previously provided based on similar activity, instead, it learns from the data to reduce down time for errors, conflicts, trust issues, certificates, handshake issues, new or upgraded incompatibility with legacy devices, etc. Further, HQTE 340 is not merely a formatting of a previously done process, but it is a real-time, constantly updating estimator that not only compares similar jobs across similar SDDC's but can extrapolate a HQTE 340 for non-similar SDDC's, based on a breakdown of the required steps in a given job (which may include thousands or hundreds of thousands of steps and hundreds or thousands of VM's), an extrapolation of a large SDDC based on a smaller SDDC, an extrapolation of a HQTE 340 for a smaller SDDC based on a larger SDDC, and the like.

For example, there are a plurality of different SDDC's that have opted into the VAC 202 estimator experience. Each of the SDDC's report configuration information, upgrades that have been performed, time it took, trust issues (authorizations, allowances, admissions, etc.) that occurred during reboot, reconfiguration etc. For example, a total time SDDC was off-line (e.g., 26 hours) or a breakdown of the total time SDDC was off-line (e.g., initial down for upgrade (2 hours), upgrade completion time (21 hours), reboot time (30 minutes), reconfigure and resolve trust issues time (2 hours), and back on-line/operational tests (30 minutes)).

This information would be stored for the plurality of different SDDC's that have opted into the program. Then, when an SDDC X was getting ready to perform an upgrade, the upgrade system would receive the configuration of SDDC X and compare it to the plurality of different SDDC's in the database. The upgrade system would then find the closest matching SDDC's to SDDC X that have performed the upgrade. The upgrade system would then develop a HQTE 340 based on the actual time required for the upgrade by the closest matching SDDC's.

Thus, HQTE 340 can be used for installation of an SDDC, an upgrade to an existing SDDC, virus scan for an existing SDDC, addition of components to an existing SDDC, removal of components from an SDDC, pricing, customer costs, build time, and the like. Thus, HQTE provides the ability to understand the topology and the operational characteristics of the SDDC based on the data collection.

The examples set forth herein were presented in order to describe particular applications, and to thereby enable those skilled in the art to make and use embodiments of the described examples. However, those skilled in the art will recognize that the foregoing description and examples have been presented for the purposes of illustration and example only. The description as set forth were not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for collecting data to provide analytic based information regarding operations in a software-defined data center (SDDC), the method comprising:
    receiving, at a computing system, information about a job performed on an existing SDDC from at least one of a plurality of different existing reporting SDDC's, the information comprising:
        a description of the existing SDDC;
        a description of the job performed on the existing SDDC; and
        a plurality of time stamps, each time stamp indicative of an operation performed on the existing SDDC in order to complete the job;
    storing, in a database accessible to the computing system, the information about the job in a granular time-based data-set;
    receiving, at the computing system, a request for a time estimate for a yet-to-be-performed job from at least a second SDDC, the request including a description of the second SDDC; and
    using, at the computing system, the stored information in conjunction with the description of the second SDDC to generate a time estimate for the yet-to-be-performed job, said time estimate based on an actual time required for an upgrade to a prior existing SDDC having characteristics matching those of said second SDDC.

2. The method of claim 1 further comprising:
    generating the time estimate for an upgrade to said existing SDDC.

3. The method of claim 1 further comprising:
    generating the time estimate for a backup of said existing SDDC.

4. The method of claim 1 further comprising:
    generating the time estimate for a removal of an SDDC component from said existing SDDC.

5. The method of claim 1 further comprising:
    generating the time estimate for a virus scan of said existing SDDC.

6. The method of claim 1 further comprising:
    generating the time estimate for a new SDDC buildout.

7. The method of claim 1 further comprising:
    generating the time estimate for an addition of a new SDDC component to said existing SDDC.

8. A non-transitory computer readable storage medium having computer readable program code stored thereon for causing a computer system to perform a method for providing analytic based information regarding operations in an existing software-defined data center (SDDC), the method comprising:
    receiving information about a job performed on said existing SDDC from at least one of a plurality of different reporting SDDC's, the information comprising:
        a description of the existing SDDC;
        a description of the job performed on the existing SDDC; and
        a plurality of time stamps, each time stamp indicative of an operation performed on the existing SDDC in order to complete the job;
    storing the information about the job in a granular time-based data-set;
    receiving a request for a time estimate for a yet-to-be-performed job from at least a second SDDC, the request including a description of the second SDDC; and
    using the stored information in conjunction with the description of the second SDDC to generate a time estimate for the yet-to-be-performed job, said time estimate based on an actual time required for an upgrade to a prior existing SDDC having characteristics matching those of said second SDDC.

9. The non-transitory computer readable storage medium of claim 8 wherein the information about the job performed on the existing SDDC further comprises:
    identifying any errors encountered during the job; and
    indicating any solutions for the errors encountered during the job.

10. The non-transitory computer readable storage medium of claim 9 further comprising:
    updating the time estimate for the yet-to-be-performed job based on the errors and the solutions.

11. The non-transitory computer readable storage medium of claim 8 wherein the information about the job performed on the existing SDDC further comprises:
    identifying any conflicts encountered during the job; and
    indicating any resolution for the conflicts encountered during the job.

12. The non-transitory computer readable storage medium of claim 11 further comprising:
    updating the time estimate for the yet-to-be-performed job based on the conflicts and the resolution.

13. The non-transitory computer readable storage medium of claim 8 further comprising:
    generating the time estimate from the group consisting of: an upgrade to said existing SDDC, a backup of the existing SDDC, and a virus scan of the existing SDDC.

14. The non-transitory computer readable storage medium of claim 8 further comprising:
    generating the time estimate from the group consisting of: a removal of an SDDC component from said existing SDDC, a new SDDC buildout, and an addition of a new SDDC component to the existing SDDC.

15. A system comprising:
    one or more devices to:
        receive information about a job performed on an existing software-defined data center (SDDC) from at least one of a plurality of different reporting SDDC's, the information comprising:
            a description of the existing SDDC;
            a description of the job performed on the existing SDDC; and
            a plurality of time stamps, each time stamp indicative of an operation performed on the existing SDDC in order to complete the job;
        store the information about the job in a granular time-based data-set;
        receive a request for a time estimate for a yet-to-be-performed job from at least a second SDDC, the request including a description of the second SDDC; and
        use the stored information in conjunction with the description of the second SDDC to generate a time estimate for the yet-to-be-performed job, said time estimate based on an actual time required for an upgrade to a prior existing SDDC having characteristics matching those of said second SDDC.

16. The system of claim 15 wherein the information about the job performed on the existing SDDC further comprises one or more devices to:
    identify any errors encountered during the job;
    indicate any solutions for the errors encountered during the job; and
    update the time estimate for the yet-to-be-performed job based on the errors and the solutions.

17. The system claim 15 wherein the information about the job performed on the existing SDDC further comprises one or more devices to:
    identify any conflicts encountered during the job; and
    indicate any resolution for the conflicts encountered during the job.

18. The system of claim 17 further comprising:
one or more devices to:
    update the time estimate for the yet-to-be-performed job based on the conflicts and the resolution.

19. The system of claim 15 further comprising:
one or more devices to:
    generate the time estimate from the group consisting of: an upgrade to said existing SDDC, a backup of the existing SDDC, and a virus scan of the existing SDDC.

20. The system of claim 15 further comprising:
one or more devices to:
    generate the time estimate from the group consisting of: a removal of an SDDC component from said existing SDDC, a new SDDC buildout, and an addition of a new SDDC component to the existing SDDC.

* * * * *